(12) United States Patent
Chaturvedi et al.

(10) Patent No.: US 11,710,056 B2
(45) Date of Patent: Jul. 25, 2023

(54) LEARNING MODEL BASED RECOMMENDATION ENGINE

(71) Applicant: SAP SE, Walldorf (DE)

(72) Inventors: Abhishek Chaturvedi, Bangalore (IN); Nithya Rajagopalan, Bangalore (IN); Gurudayal Khosla, Chhindwara (IN); Sunil Gornalle, Bidar (IN)

(73) Assignee: SAP SE, Walldorf (DE)

( * ) Notice: Subject to any disclaimer, the term of this patent is extended or adjusted under 35 U.S.C. 154(b) by 1021 days.

(21) Appl. No.: 16/224,690

(22) Filed: Dec. 18, 2018

(65) Prior Publication Data

US 2020/0193316 A1    Jun. 18, 2020

(51) Int. Cl.
*G06N 7/01*    (2023.01)
*G06N 20/00*    (2019.01)
*G06F 16/2457*    (2019.01)

(52) U.S. Cl.
CPC ........... *G06N 7/01* (2023.01); *G06F 16/2457* (2019.01); *G06N 20/00* (2019.01)

(58) Field of Classification Search
CPC ........ G06N 20/00; G06N 20/10; G06N 20/20; G06N 7/00; G06N 7/005; G06N 5/00; G06N 5/02; G06N 5/022; G06N 5/04; G06Q 30/00; G06Q 30/06; G06Q 30/0601; G06Q 30/0631
See application file for complete search history.

(56) References Cited

U.S. PATENT DOCUMENTS

| 8,239,287 B1* | 8/2012 | Smith ................ G06Q 30/0241 705/26.7 |
| 2003/0083925 A1* | 5/2003 | Weaver ................. G06Q 10/06 705/7.34 |
| 2009/0210320 A1* | 8/2009 | Adelman ........... G06Q 30/0641 705/26.1 |

(Continued)

OTHER PUBLICATIONS

Deshpande et al. "Item-Based Top-N Recommendation Algorithms", Jan. 2004 https://dl.acm.org/doi/pdf/10.1145/963770.963776 (Year: 2004).*

(Continued)

*Primary Examiner* — Kamran Afshar
*Assistant Examiner* — Shoun J Abraham
(74) *Attorney, Agent, or Firm* — Mintz Levin Cohn Ferris Glovsky and Popeo, P.C.

(57) ABSTRACT

A method may include receiving, at a recommendation engine, a first indication to create a first sourcing event that includes a first object and a second object. The recommendation engine may respond to the first indication by updating a learning model to increment a first frequency of the first object being included in a sourcing event, a second frequency of the second object being included in a sourcing event, and/or a third frequency of the first object and the second object being included simultaneously in a sourcing event. The recommendation engine may receive a second indication to create a second sourcing event. In response to the second indication, the recommendation engine may apply the learning model to generate a recommendation to add, to the second sourcing event, the first object instead of the second object. Related systems and articles of manufacture are also provided.

18 Claims, 7 Drawing Sheets

(56) References Cited

U.S. PATENT DOCUMENTS

2016/0048902 A1* 2/2016 Ward ................. G06Q 30/0631
705/26.7
2016/0292705 A1* 10/2016 Ayzenshtat ........ G06Q 30/0204

OTHER PUBLICATIONS

Xiao et al. "E-Commerce Product Recommendation Using Historical Purchases and Clickstream Data", Aug. 2018 https://link.springer.com/content/pdf/10.1007%2F978-3-319-98539-8_6.pdf (Year: 2018).*
Shani et al. An MDP-Based Recommender System, 2005 https://www.jmlr.org/papers/volume6/shani05a/shani05a.pdf (Year: 2005).*

* cited by examiner

FIG. 1

| User Identifier | Object Identifier | Frequency |
|---|---|---|
| User1 | A | 1 |
| User1 | B | 1 |
| User1 | C | 1 |

200

| User Identifier | Object Relation Identifier | First Object | Second Object | Frequency |
|---|---|---|---|---|
| User1 | A-B | A | B | 1 |
| User1 | A-C | A | C | 1 |
| User1 | B-C | B | C | 1 |

LEARNING MODEL BASED RECOMMENDATION ENGINE

TECHNICAL FIELD

The subject matter described herein relates generally to database processing and more specifically to a learning model based technique for generating recommendations.

BACKGROUND

A database (e.g., a relational database, a non-relational database, and/or the like) may be configured to store a plurality of electronic data records. These data records may be organized into various database objects including, for example, database tables, graphs, and/or the like. The database may be coupled with a database management system (DBMS) that supports a variety of operations for accessing the data records held in the database. These operations may include, for example, structure query language (SQL) statements, a graph query language statement, and/or the like.

SUMMARY

Systems, methods, and articles of manufacture, including computer program objects, are provided for generating a recommendation. In one aspect, there is provided a system. The system may include at least one data processor and at least one memory. The at least one memory may store instructions that cause operations when executed by the at least one data processor. The operations may include: receiving, at a recommendation engine, a first indication to create a first sourcing event that includes a first object and a second object; responding to the first indication by at least updating a learning model, the learning model being updated by at least incrementing a first frequency of the first object being included in a sourcing event, a second frequency of the second object being included in a sourcing event, and/or a third frequency of the first object and the second object being included simultaneously in a sourcing event; receiving, at the recommendation engine, a second indication to create a second sourcing event; and responding to the second indication by at least applying the learning model to generate a first recommendation to add, to the second sourcing event, the first object instead of the second object.

In some variations, one or more features disclosed herein including the following features can optionally be included in any feasible combination. The first recommendation may be generated based at least on the learning model indicating that the first frequency of the first object being included in a sourcing event is greater than the second frequency of the second object being included in a sourcing event.

In some variations, the first recommendation may be further generated based at least on the learning model indicating that the first frequency of the first object being included in a sourcing event exceeds a threshold value and the second frequency of the second object being included in a sourcing event does not exceed the threshold value.

In some variations, a third indication to update the second sourcing event to include the first object may be received at the recommendation engine. In response to the third indication, the learning model may be applied to determine a first probability factor of the second object being included in a sourcing event that includes the first object. The first probability factor being determined based at least on the first frequency of the first object being included in a sourcing event and the third frequency of the first object and the second object being included in a sourcing event. A second recommendation may be generated to add, to the second sourcing event, the second object. The second recommendation may be generated based at least on the first probability factor being greater than a second probability factor of a third object being included in a sourcing event that includes the first object.

In some variations, a fourth indication to update the second sourcing event to include the second object in addition to the first object may be received at the recommendation engine. In response to the fourth indication, the learning model may be applied to determine a third probability factor of the third object being included in a sourcing event that includes the first object and the second object. The third probability factor may be determined based at least on the first frequency of the first object being included in a sourcing event, the second frequency of the second object being included in a sourcing event, a fourth frequency of the first object and the third object being simultaneously included in a sourcing event, and a fifth frequency of the second object and the third object being simultaneously included in a sourcing event. A third recommendation may be generated to add, to the second sourcing event, the third object. The third recommendation may be generated based at least on the third probability factor being greater than a fourth probability factor of a fourth object being included in a sourcing event that includes the first object and the second object.

In some variations, the learning model may include a first table configured to store the first frequency and the second frequency. The learning model may further include a second table configured to store the third frequency. In response to a determination that the learning model does not include the first object and/or the second object, the first table and/or the second table may be expanded to include the first object and/or the second object. The first table and/or the second table may be stored in a database. The recommendation engine may query the database in order to update and/or apply the learning model.

In some variations, the first frequency, the second frequency, and the third frequency may be associated with a first user. The first recommendation may be generated using the first frequency, the second frequency, and/or the third frequency based at least on the second indication to create the second sourcing event being received from the first user.

In some variations, the first frequency, the second frequency, and the third frequency may be associated with a group of users having at least one attribute in common. The first recommendation may be generated using the first frequency, the second frequency, and/or the third frequency based at least on the second indication to create the second sourcing event being received from a user associated with the group of users.

In another aspect, there is provided a method for generating a recommendation. The method may include: receiving, at a recommendation engine, a first indication to create a first sourcing event that includes a first object and a second object; responding to the first indication by at least updating a learning model, the learning model being updated by at least incrementing a first frequency of the first object being included in a sourcing event, a second frequency of the second object being included in a sourcing event, and/or a third frequency of the first object and the second object being included simultaneously in a sourcing event; receiving, at the recommendation engine, a second indication to create a second sourcing event; and responding to the second indication by at least applying the learning model to generate a first recommendation to add, to the second sourcing event, the first object instead of the second object.

In some variations, one or more features disclosed herein including the following features can optionally be included in any feasible combination. The first recommendation may be generated based at least on the learning model indicating that the first frequency of the first object being included in a sourcing event is greater than the second frequency of the second object being included in a sourcing event.

In some variations, the first recommendation may be further generated based at least on the learning model indicating that the first frequency of the first object being included in a sourcing event exceeds a threshold value and the second frequency of the second object being included in a sourcing event does not exceed the threshold value.

In some variations, the method may further include: receiving, at the recommendation engine, a third indication to update the second sourcing event to include the first object; responding to the third indication by at least applying the learning model to determine a first probability factor of the second object being included in a sourcing event that includes the first object, the first probability factor being determined based at least on the first frequency of the first object being included in a sourcing event and the third frequency of the first object and the second object being included in a sourcing event; and generating a second recommendation to add, to the second sourcing event, the second object, the second recommendation being generated based at least on the first probability factor being greater than a second probability factor of a third object being included in a sourcing event that includes the first object.

In some variations, the method may further include: receiving, at the recommendation engine, a fourth indication to update the second sourcing event to include the second object in addition to the first object; responding to the fourth indication by at least applying the learning model to determine a third probability factor of the third object being included in a sourcing event that includes the first object and the second object, the third probability factor being determined based at least on the first frequency of the first object being included in a sourcing event, the second frequency of the second object being included in a sourcing event, a fourth frequency of the first object and the third object being simultaneously included in a sourcing event, and a fifth frequency of the second object and the third object being simultaneously included in a sourcing event; and generating a third recommendation to add, to the second sourcing event, the third object, the third recommendation being generated based at least on the third probability factor being greater than a fourth probability factor of a fourth object being included in a sourcing event that includes the first object and the second object.

In some variations, the learning model may include a first table configured to store the first frequency and the second frequency. The learning model further may further include a second table configured to store the third frequency. In response to a determination that the learning model does not include the first object and/or the second object, the first table and/or the second table may be expanded to include the first object and/or the second object. The first table and/or the second table may be stored in a database. The recommendation engine may query the database in order to update and/or apply the learning model.

In some variations, the first frequency, the second frequency, and the third frequency may be associated with a group of users having at least one attribute in common. The first recommendation may be generated using the first frequency, the second frequency, and/or the third frequency based at least on the second indication to create the second sourcing event being received from a user associated with the group of users.

In another aspect, there is provided a computer program product that includes a non-transitory computer readable storage medium. The non-transitory computer readable storage medium may include program code that causes operations when executed by at least one data processor. The operations may include: receiving, at a recommendation engine, a first indication to create a first sourcing event that includes a first object and a second object; responding to the first indication by at least updating a learning model, the learning model being updated by at least incrementing a first frequency of the first object being included in a sourcing event, a second frequency of the second object being included in a sourcing event, and/or a third frequency of the first object and the second object being included simultaneously in a sourcing event; receiving, at the recommendation engine, a second indication to create a second sourcing event; and responding to the second indication by at least applying the learning model to generate a first recommendation to add, to the second sourcing event, the first object instead of the second object.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to generating recommendations, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

In some example embodiments, a recommendation engine may be configured to generate recommendations for one or more objects to include in a sourcing event. For example, when a user creates a sourcing event, the recommendation engine may generate a recommendation for the first user to add a first object to the sourcing event. Alternatively and/or additionally, when the user adds the first object and/or a second object to the sourcing event, the recommendation engine may generate a recommendation for the first user to add a third object to the sourcing event. The recommendation engine may apply a learning model in order to generate the recommendation for the user. For instance, the learning model may be generated and/or updated based on one or more previous sourcing events associated with the user. Accordingly, the learning model may indicate a frequency at which individual objects are included in the one or more previous sourcing events associated with the user. Furthermore, the learning model may also indicate a frequency at which combinations of objects are included in the one or more previous sourcing events associated with the user.

In some example embodiments, the learning model may be stored in one or more tables in a database. The learning model may include a first table storing a frequency at which individual objects are included in one or more previous sourcing events associated with the user. For example, the first table may store a frequency at which the first object, the second object, and/or the third object are included in the one or more previous sourcing events associated with the user. Furthermore, the learning model may include a second table storing a frequency at which various combinations of objects are included in the one or more previous sourcing events associated with the user. For instance, the second table may store a frequency at which the first object and the second object are simultaneously included in the one or more previous sourcing events associated with the user. Alternatively and/or additionally, the second table may store a frequency at which the first object and the third object are simultaneously included in the one or more previous sourcing events associated with the user. The second table may further store a frequency at which the second object and the third object are simultaneously included in the one or more previous sourcing events associated with the user.

In some example embodiments, instead of fixed sized tables storing a static set of objects, the one or more tables storing the learning model may be expanded dynamically to include additional objects when the user adds, to one or more sourcing events, objects that are not already a part of the learning model. For example, while the learning model includes only the first object, the second object, and the third object, the user may add, to a sourcing event, a fourth object. In response to the addition of the fourth object to the sourcing event, the recommendation engine may expand the one or more tables storing the learning model to accommodate the fourth object. For instance, the first table may be expanded to include the frequency at which the fourth object is included in one or more previous sourcing events associated with the user. Furthermore, the second table may be expanded to include the frequency with which the fourth object is included in the one or more previous sourcing events together with the first object, the second object, and/or the third object.

Figure 1:
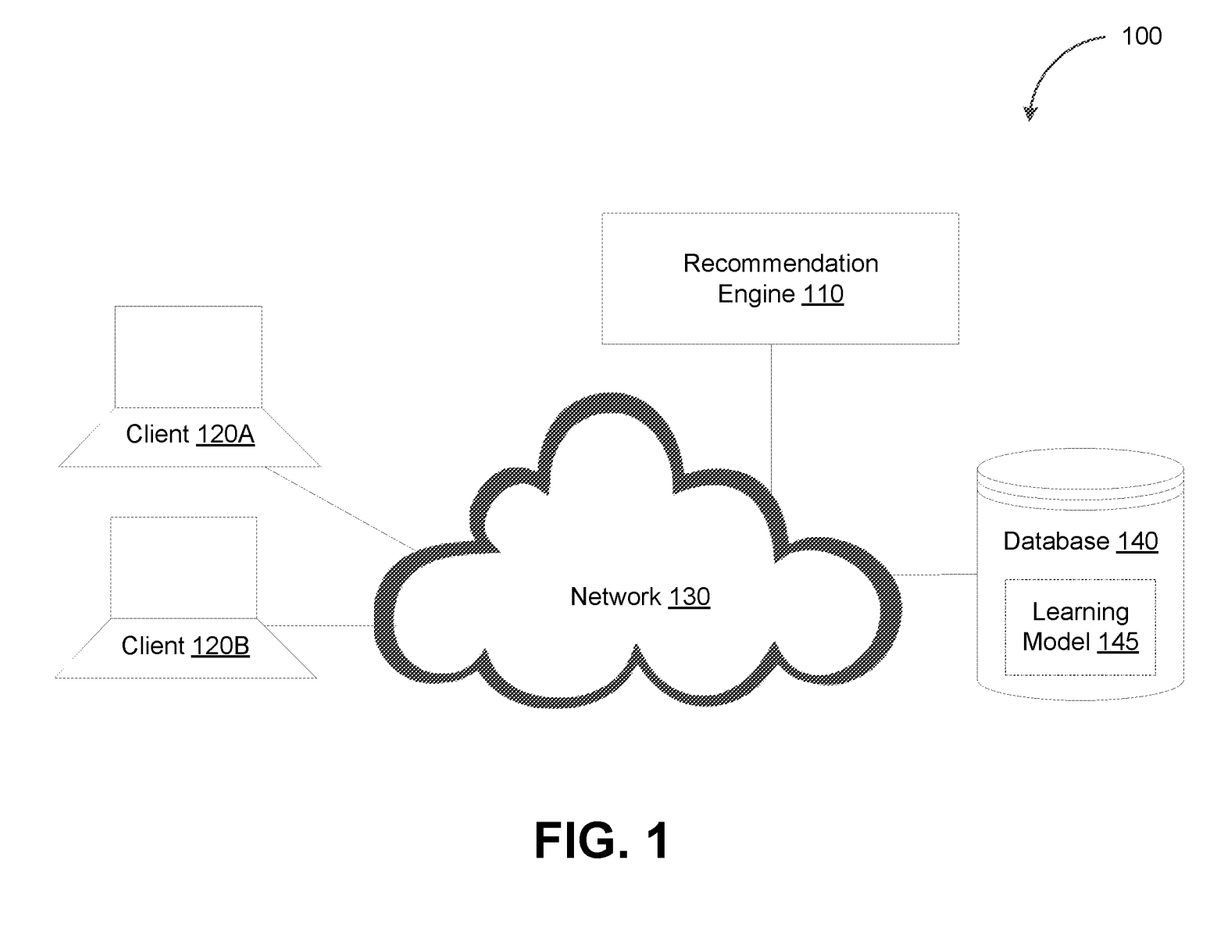
FIG. 1 depicts a system diagram illustrating a recommendation system, in accordance with some example embodiments.

FIG. 1 depicts a system diagram illustrating a recommendation system 100, in accordance with some example embodiments. Referring to FIG. 1, the recommendation system 100 may include a recommendation engine 110 that is communicatively coupled with a database 140 via a network 130. Furthermore, the recommendation engine 110 may be communicatively coupled, via the network 130, with a plurality of clients including, for example, a first client 120A, a second client 120B, and/or the like. It should be appreciated that the first client 120A may be any type of processor and memory based device including, for example, a cellular phone, smart phone, a tablet, a laptop computer, a desktop, a workstation, and/or the like. Meanwhile, the network 130 may be any wired and/or wireless network including, for example, a public land mobile network (PLMN), a local area network (LAN), a wide area network (WAN), a virtual local area network (VLAN), the Internet, and/or the like. The database 140 may be any type of database including, for example, a graph database, an in-memory database, a relational database, a non-SQL (NoSQL) database, and/or the like.

The recommendation engine 110 may receive, from the first client 120A, an indication to create a sourcing event. As used herein, a sourcing event may refer to an electronic purchase order, an electronic request for proposal, an electronic invitation for bid, and/or the like, created by the first client 120A. In some example embodiments, in response to receiving the indication to create the sourcing event, the recommendation engine 110 may generate a recommendation for the first client 120A to add, to the sourcing event, a first object. Alternatively and/or additionally, the recommendation engine 110 may receive, from the first client 120A, an indication to add, to the sourcing event, the first object and/or a second object. The recommendation engine 110 may respond to the indication to add the first object and/or the second object by at least generating a recommendation for the first client 120A to add, to the sourcing event, a third object.

In some example embodiments, the recommendation engine 110 may generate and/or update, based at least on one or more sourcing events created by the first client 120A, a learning model 145. For example, in response to the creation of a sourcing event that includes the first object and the second object, the recommendation engine 110 may update the learning model 145 to increment a frequency of the first object being included in a sourcing event and a frequency of the second object being included in a sourcing event. Alternatively and/or additionally, the recommendation engine 110 may update the learning model 145 to increment a frequency of the first object and the second object being simultaneously included in a sourcing event.

Referring again to FIG. 1, it should be appreciated that the learning model 145 may be generated and/or updated based on sourcing events created by additional clients including, for example, the second client 120B. For instance, the learning model 145 may also be updated based on sourcing events created by the second client 120B. As such, in some example embodiments, the learning model 145 may track the frequencies of objects and/or combination of objects being included in sourcing events across individual clients. For example, the learning model 145 may include the frequency of the first object, the second object, and/or the third object being included in a sourcing event as well as the frequency of the second object being included in a sourcing event. Alternatively and/or additionally, the learning model 145 may track the frequencies of objects and/or combinations of objects being included in sourcing events associated with individual groups of clients. For instance, the learning model 145 may include the frequency of the first object, the second object, and/or the third object being included in a sourcing event associated with groups of clients having at least one attribute in common such as, for example, clients having a same role, clients associated with a same entity, and/or the like.

Referring again to FIG. 1, the learning model 145 may be stored as one or more database tables in the database 140. For example, the learning model 145 may include a first table storing the frequency of the first object being included in a sourcing event and the frequency of the second object being included in a sourcing event. Alternatively and/or additionally, the learning model 145 may include a second table storing the frequency of the first object and the second object being simultaneously included in a sourcing event. As such, the recommendation engine 110 may query the database 140 in order to update the learning model 145 and/or to apply the learning model 145 to generate one or more recommendations.

In some example embodiments, the learning model 145 may be stored in tables that may be expanded dynamically to include additional objects when the first client 120A creates sourcing events having objects that are not already a part of the learning model 145. For example, while the learning model 145 includes only the first object and the second object, the recommendation engine 110 may receive, from the first client 120A, an indication to add, to a sourcing event, a third object. In response to the addition of the third object to the sourcing event, the recommendation engine 110 may expand the one or more tables storing the learning model 145 to accommodate the third object. For instance, the first table may be expanded to include a fourth frequency of the third object being included in a sourcing event created by the first client 120A. Alternatively and/or additionally, the second table may be expanded to include a frequency of the third object being included in a sourcing event together with the first object and/or the second object.

As noted, when the recommendation engine 110 receives, from the first client 120A, an indication to create a sourcing event, the recommendation engine 110 may respond by at least applying the learning model 145 to generate a recommendation for the first client 120A to add, to the sourcing event, the first object. Accordingly, the recommendation engine 110 may generate the recommendation to add the first object to the sourcing event based at least on the frequency of the first object being included in a sourcing event. For example, the recommendation engine 110 may generate the recommendation to add the first object based at least on the first object being included in a sourcing event more frequently than the second object and/or the third object. Alternatively and/or additionally, the recommendation engine 110 may generate the recommendation to add the first object based at least on the frequency of the first object being included in a sourcing event exceeding a threshold value whereas the frequency of the second object and/or the third object being included in a sourcing event does not exceed the threshold value.

In response to receiving, from the first client 120A, an indication to add the first object to sourcing event, the recommendation engine 110 may apply the learning model 145 to generate a recommendation for the first client 120A to add, to the sourcing event, the second object. The recommendation to add the second object to the sourcing event may be generated by the recommendation engine 110 applying Equation (1) below to determine a probability factor $P_2$ of the second object being included in a sourcing event.

$$P_2 = \frac{f_1}{f_2} \qquad (1)$$

wherein $f_1$ may denote a frequency of the first object and the second object being included in a sourcing event and $f_2$ may denote a frequency of the first object being included in a sourcing event.

As Equation (1) indicates, the probability factor $P_2$ of the second object being included in a sourcing event that already includes the first object may be determined based at least on the frequency $f_1$ of the first object and the second object being simultaneously included in a sourcing event and the frequency $f_2$ of the first object being included in a sourcing event. The recommendation engine 110 may generate the recommendation to add the second object based at least on the probability factor $P_2$ being greater than a probability factor of another object being included in the sourcing event along with the first object. Alternatively and/or additionally, the recommendation engine 110 may generate the recommendation to add the second object based at least on the probability factor $P_2$ exceeding a threshold value.

Alternatively and/or additionally, in response to receiving, from the first client 120A, an indication to add the first object and the second object to the sourcing event, the recommendation engine 110 may apply the learning model 145 to generate a recommendation for the first client 120A to add, to the sourcing event, the third object. For example, the recommendation engine 110 may apply Equation (2) below to determine a probability factor $P_3$ of the third object being included in a sourcing event that includes the first object and the second object.

$$P_3 = \frac{f_1}{f_2} + \frac{f_3}{f_4} \qquad (2)$$

wherein $f_1$ may denote a frequency of the first object and the third object being simultaneously included in a sourcing event, $f_2$ may denote a frequency of the first object being included in a sourcing event, $f_3$ may denote a frequency of the second object and the third object being included in a sourcing event, and $f_4$ may denote a frequency of the second object being included in a sourcing event.

As Equation (2) indicates, the probability factor $P_3$ may be determined based at least on the frequency $f_1$ of the first object and the third object being simultaneously included in a sourcing event, the frequency $f_2$ of the first object being included in a sourcing event, the frequency $f_3$ of the second object and the third object being simultaneously included in a sourcing event, and the frequency $f_4$ of the second object being included in a sourcing event. The recommendation engine 110 may generate the recommendation to add the third object based at least on the probability factor $P_3$ being greater than a probability factor of another object being included in the sourcing event along with the first object and the second object. Alternatively and/or additionally, the recommendation engine 110 may generate the recommendation to add the third object based at least on the probability factor $P_3$ exceeding a threshold value.

Figure 2A:
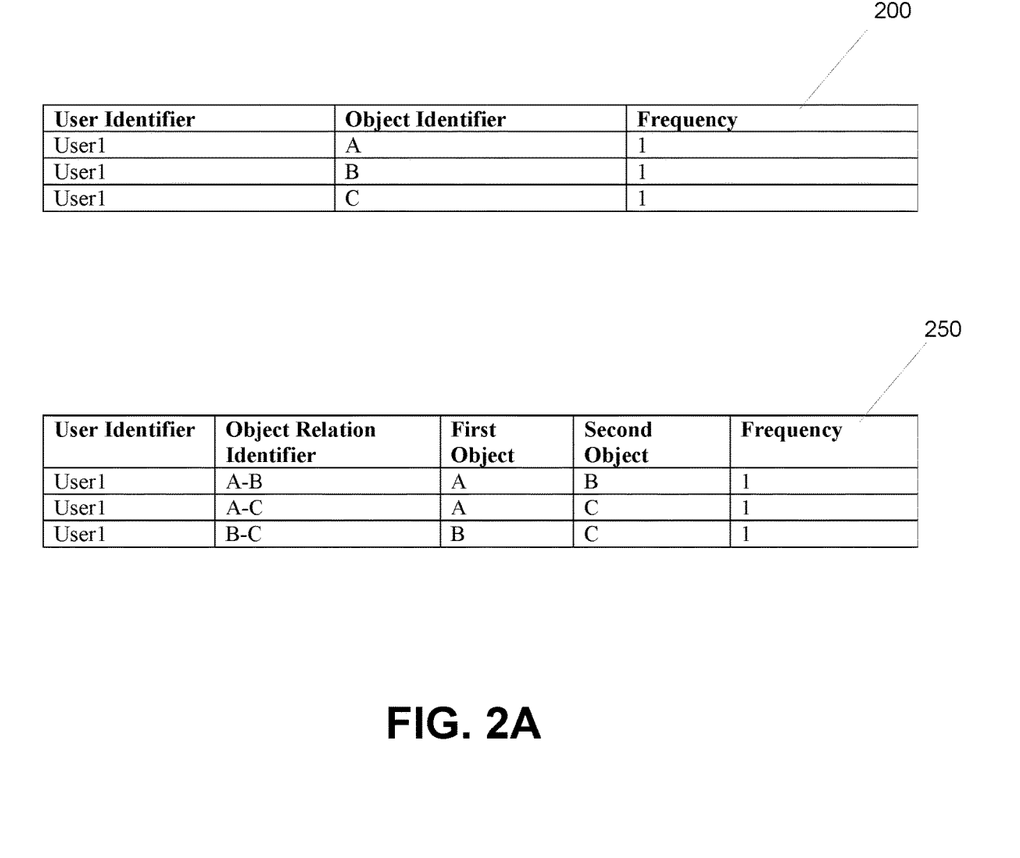
FIG. 2A depicts an example of a learning model stored at a database, in accordance with some example embodiments.
Figure 2B:
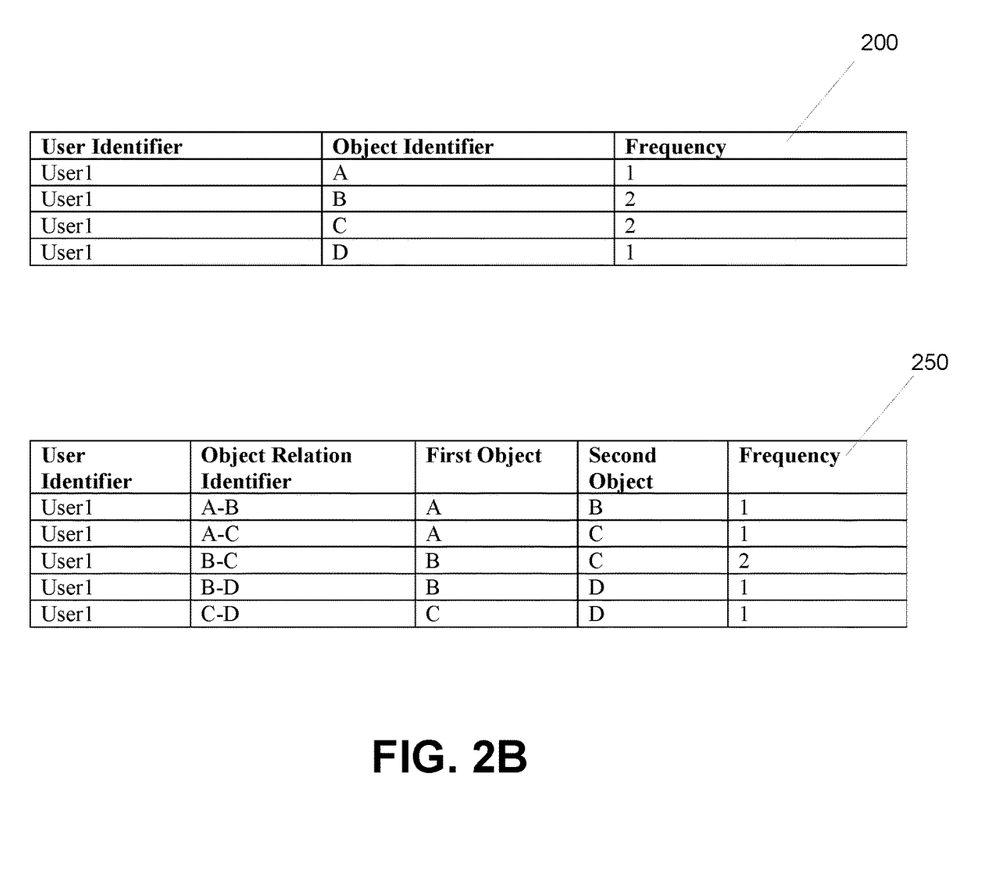
FIG. 2B depicts an example of a learning model stored at a database, in accordance with some example embodiments.
Figure 2C:
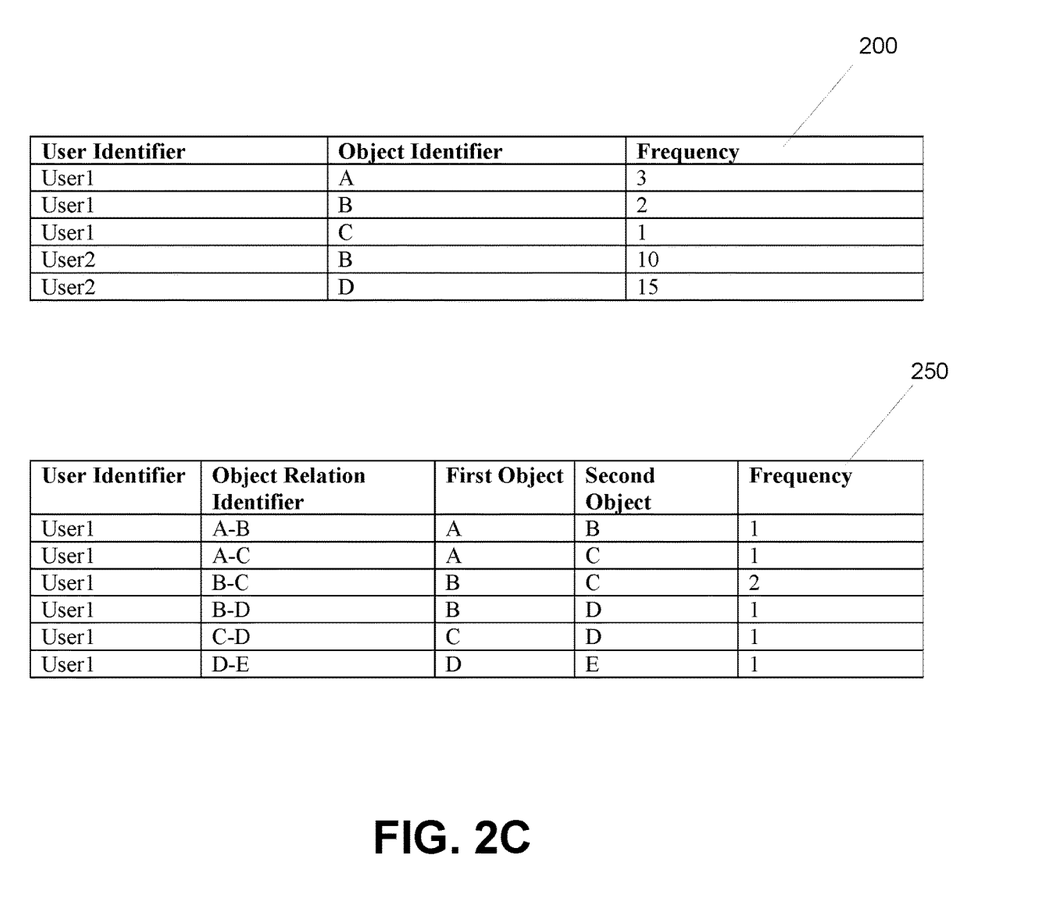
FIG. 2C depicts an example of a learning model stored at a database, in accordance with some example embodiments.

To further illustrate, FIGS. 2A-C depict an example of the learning model 145 stored at the database 140, in accordance with some example embodiments. Referring to FIGS. 1 and 2A-C, the learning model 145 may include one or more tables stored at the database 140 including, for example, a first table 200, a second table 250, and/or the like. Moreover, in some example embodiments, the recommendation engine 110 may generate and/or update the learning model 145 including, for example, the first table 200 and/or the second table 250, based on sourcing events created by the first client 120A. Alternatively and/or additionally, the recommendation engine 110 may generate, based at least on the first table 200 and/or the second table 250 included in the learning model 145, recommendations for the first client 120A to include one or more objects in a sourcing event.

As shown in FIGS. 2A-C, the first table 200 may store the frequencies of individual objects being included in sourcing events associated with individual users. For example, the first table 200 may store the frequencies of USER 1 and/or USER 2 including OBJECT A, OBJECT B, OBJECT C, OBJECT D, and/or OBJECT E in a sourcing event. Alternatively and/or additionally, FIGS. 2A-C shows the second table 250 as storing the frequencies of combinations of objects being included in a sourcing event associated with individual users. For instance, the second table 250 may store the frequencies of USER 1 and/or USER 2 including pairs of OBJECT A, OBJECT B, OBJECT C, OBJECT D, and/or OBJECT E in a sourcing event.

FIG. 2A depicts the first table 200 and the second table 250 of the learning model 145 subsequent to USER 1 associated, for example, with the first client 120A, creating a sourcing event that includes OBJECT A, OBJECT B, and OBJECT C. For example, the first table 200 and/or the second table 250 may be initialized as empty tables. In response to USER 1 creating a sourcing event that includes OBJECT A, OBJECT B, and OBJECT C, the recommendation engine 110 may update the first table 200 by at least incrementing the respective frequencies of USER 1 including OBJECT A, OBJECT B, and OBJECT C in a sourcing event. Alternatively and/or additionally, the recommendation engine 110 may update the second table 250 by at least incrementing the respective frequencies of USER 1 including, in a sourcing event, pairs of objects including, for example, OBJECT A and OBJECT B, OBJECT A and OBJECT C, and OBJECT B and OBJECT C.

FIG. 2B depicts the first table 200 and the second table 250 of the learning model 145 subsequent to USER 1 creating another sourcing event that includes OBJECT B, OBJECT C, and OBJECT D. In response to USER 1 creating another sourcing event that includes OBJECT B, OBJECT C, and OBJECT D, the recommendation engine 110 may update the first table 200 by at least incrementing the respective frequencies of USER 1 including OBJECT B and OBJECT C in a sourcing event. Furthermore, the recommendation engine 110 may update the first table 200 by expanding the first table 200 to store the frequency of OBJECT D being included in a sourcing event associated with USER 1.

Alternatively and/or additionally, the recommendation engine 110 may respond to USER 1 creating the other sourcing event that includes OBJECT B, OBJECT C, and OBJECT D by updating the second table 250 to increment the frequency of USER 1 including OBJECT B and OBJECT C simultaneously in a sourcing event. The recommendation engine 110 may further expand the second table 250 to store the frequency of OBJECT B and OBJECT D being simultaneously included in a sourcing event associated with USER 1 as well as the frequency of OBJECT C and OBJECT D being simultaneously included in a sourcing event associated with USER 1. As FIGS. 2A-B show, the first table 200 and the second table 250 may be expanded dynamically in response to the creation of sourcing events that include objects not already present in the first table 200 and/or the second table 250. Accordingly, instead of a preconfigured and/or static set of objects, the learning model 145 may be capable of accommodating any quantity of objects.

FIG. 2C depicts the first table 200 and the second table 250 of the learning model 145 subsequent to the creation of sourcing events by multiple users including, for example, USER 1 associated with the first client 120A, USER 2 associated with the second client 120B, and/or the like. For example, as shown in FIG. 2C, the recommendation engine 110 may update the first table 200 to store the respective frequencies of USER 1 including OBJECT A, OBJECT B, and OBJECT C in a sourcing event. Furthermore, the first table 200 may store the respective frequencies of USER 2 including OBJECT B and OBJECT D in a sourcing event. Alternatively and/or additionally, the second table 250 may be updated to store the respective frequencies of USER 1 including, in a sourcing event, pairs of objects including, for example, OBJECT A and OBJECT B, OBJECT A and OBJECT C, OBJECT B and OBJECT C, OBJECT B and OBJECT D, OBJECT C and OBJECT D, OBJECT D and OBJECT E, and/or the like.

As noted, the recommendation engine 110 may apply the learning model 145 to generate a recommendation for adding one or more objects to a sourcing event. For example, in response to USER 1 creating a sourcing event, the recommendation engine 110 may determine, based at least on the first table 200, one or more objects having a highest frequency of being included in a sourcing event associated with USER 1. Alternatively and/or additionally, in response to USER 1 creating a sourcing event that includes a first object and/or a second object, the recommendation engine 110 may determine, based at least on the first table 200 and/or the second table 250, a probability factor for a third object to be included in a sourcing event along with the first object and/or the second object. The recommendation engine 110 may generate, based on the probability factor for the third object, a recommendation for USER 1 to add the third object or a fourth object to the sourcing event that includes the first object and/or the second object.

Figure 3:
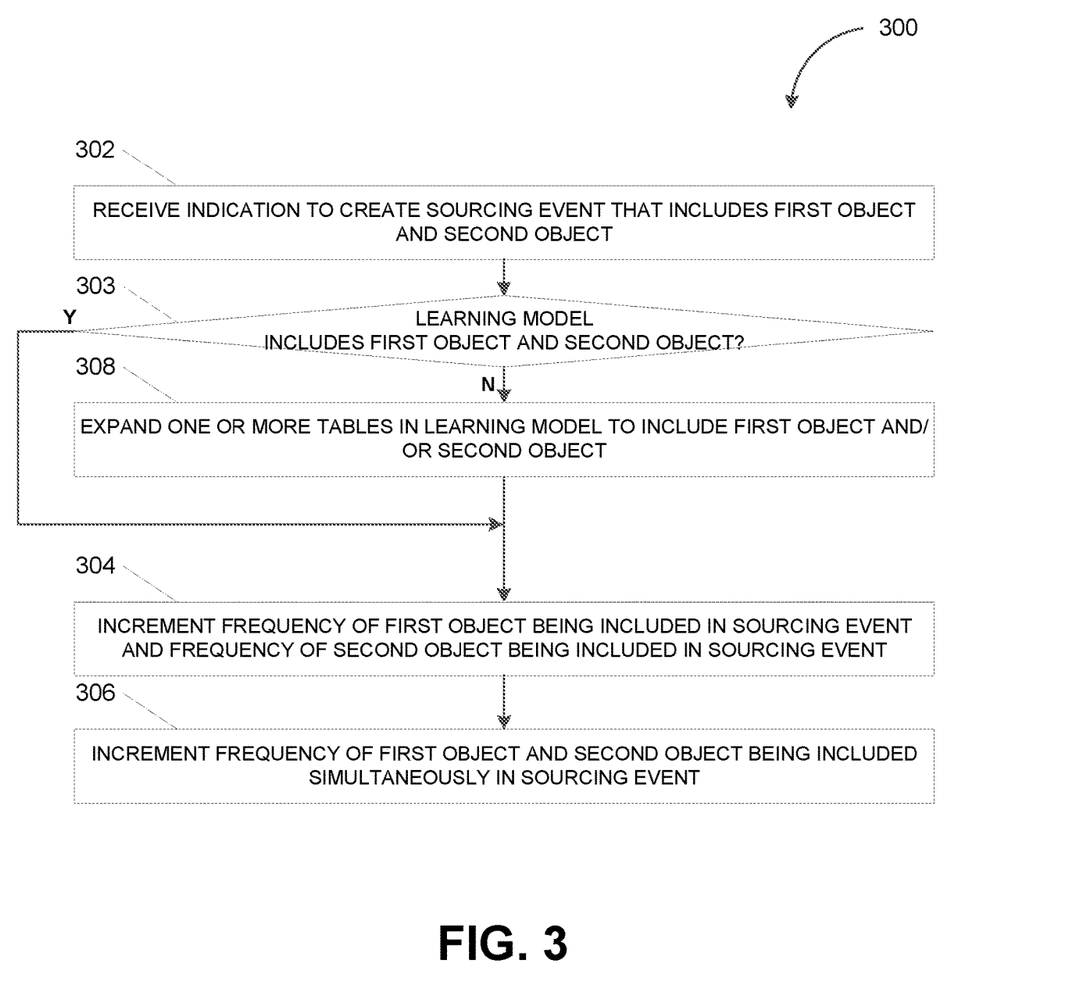
FIG. 3 depicts a flowchart illustrating a process for generating and/or updating a learning model, in accordance with some example embodiments.

FIG. 3 depicts a flowchart illustrating a process 300 for generating and/or updating a learning model, in accordance with some example embodiments. Referring to FIGS. 1, 2A-C, and 3, the process 300 may be performed by the recommendation engine 110 in order to generate and/or update, for example, the learning model 145.

At 302, the recommendation engine 110 may receive, from the first client 120A, an indication to create a sourcing event that includes a first object and a second object. For example, the recommendation engine 110 may receive, from the first client 120A, an indication to create a sourcing event that includes OBJECT A, OBJECT B, and OBJECT C.

At 303, the recommendation engine 110 may determine whether the learning model 145 includes the first object and the second object. For example, in response to receiving the indication to create the sourcing event, the recommendation engine 110 may determine whether the learning model 145 includes OBJECT A, OBJECT B, and OBJECT C. As shown in FIGS. 2A-C, the learning model 145 may include the first table 200 and the second table 250. Accordingly, the recommendation engine 110 may determine whether OBJECT A, OBJECT B, and OBJECT C are present in the first table 200 and/or the second table 250.

At 303-Y, the recommendation engine 110 may determine that the learning model 145 includes the first object and the second object. In response to determining that the learning model 145 includes the first object and the second object, at 304, the recommendation engine 110 may increment the frequency of the first object being included in a sourcing event and the frequency of the second object being included in a sourcing event. Furthermore, at 306, the recommendation engine 110 may increment the frequency of the first object and the second object being included simultaneously in a sourcing event.

For instance, if the recommendation engine 110 determines that the learning model 145 include OBJECT A, OBJECT B, and OBJECT C, the recommendation engine 110 may respond to the creation of the sourcing event including OBJECT A, OBJECT B, and OBJECT C by at least updating the first table 200 included in the learning model 145 to increment the respective frequencies of OBJECT A, OBJECT B, and OBJECT C being included in a sourcing event. The recommendation engine 110 may further update the second table 250 included in the learning model 145 to increment the respective frequencies of combinations (e.g., pairs and/or the like) of OBJECT A, OBJECT B, and OBJECT C being included in a sourcing event.

As shown in FIGS. 2A-C, the learning model 145 may track the frequencies of OBJECT A, OBJECT B, and OBJECT C being included individually and/or in combination in sourcing events associated with individual users including, for example, USER 1 associated with the first client 120A, USER 2 associated with the second client 120B, and/or the like. Accordingly, the recommendation engine 110 may update the learning model 145 (e.g., the first table 200 and/or the second table 250) to increment the respective frequencies of OBJECT A, OBJECT B, and/or OBJECT C being included in a sourcing event associated specifically with USER 1 of the first client 120A. Alternatively and/or additionally, the learning model 145 may track the frequencies of OBJECT A, OBJECT B, and/or OBJECT C being included individually and/or in combination in sourcing events associated with groups of users having at least one attribute in common such as, for example, users having a same role, users associated with a same entity, and/or the like. In such instances, the recommendation engine 110 may update the learning model 145 (e.g., the first table 200 and/or the second table 250) to increment the respective frequencies of OBJECT A, OBJECT B, and/or OBJECT C being included in a sourcing event associated a group of users that include USER 1 of the first client 120A.

Alternatively and/or additionally, at 303-N, the recommendation engine 110 may determine that the learning model 145 does not include the first object and/or the second object. As such, at 304, the recommendation engine 110 may update the learning model 145 by at least expanding one or more tables included in the learning model 145 to include the first object and/or the second object. Upon expanding the one or more tables included in the learning model 145, the process 300 may continue at operations 304 wherein the recommendation engine 110 increment the frequency of the first object being included in a sourcing event and the frequency of the second object being included in a sourcing event. Furthermore, at 306, the recommendation engine 110 may increment the frequency of the first object and the second object being included simultaneously in a sourcing event. For example, if the recommendation engine 110 determines that the learning model 145 does not include OBJECT A, OBJECT B, and/or OBJECT C, the recommendation engine 110 may expand the first table 200 and/or the second table 250 to include OBJECT A, OBJECT B, and/or OBJECT C before updating the learning model 145 (e.g., the first table 200 and/or the second table 250) to increment the respective frequencies of OBJECT A, OBJECT B, and/or OBJECT C being included individually and/or in combination in a sourcing event.

Figure 4:
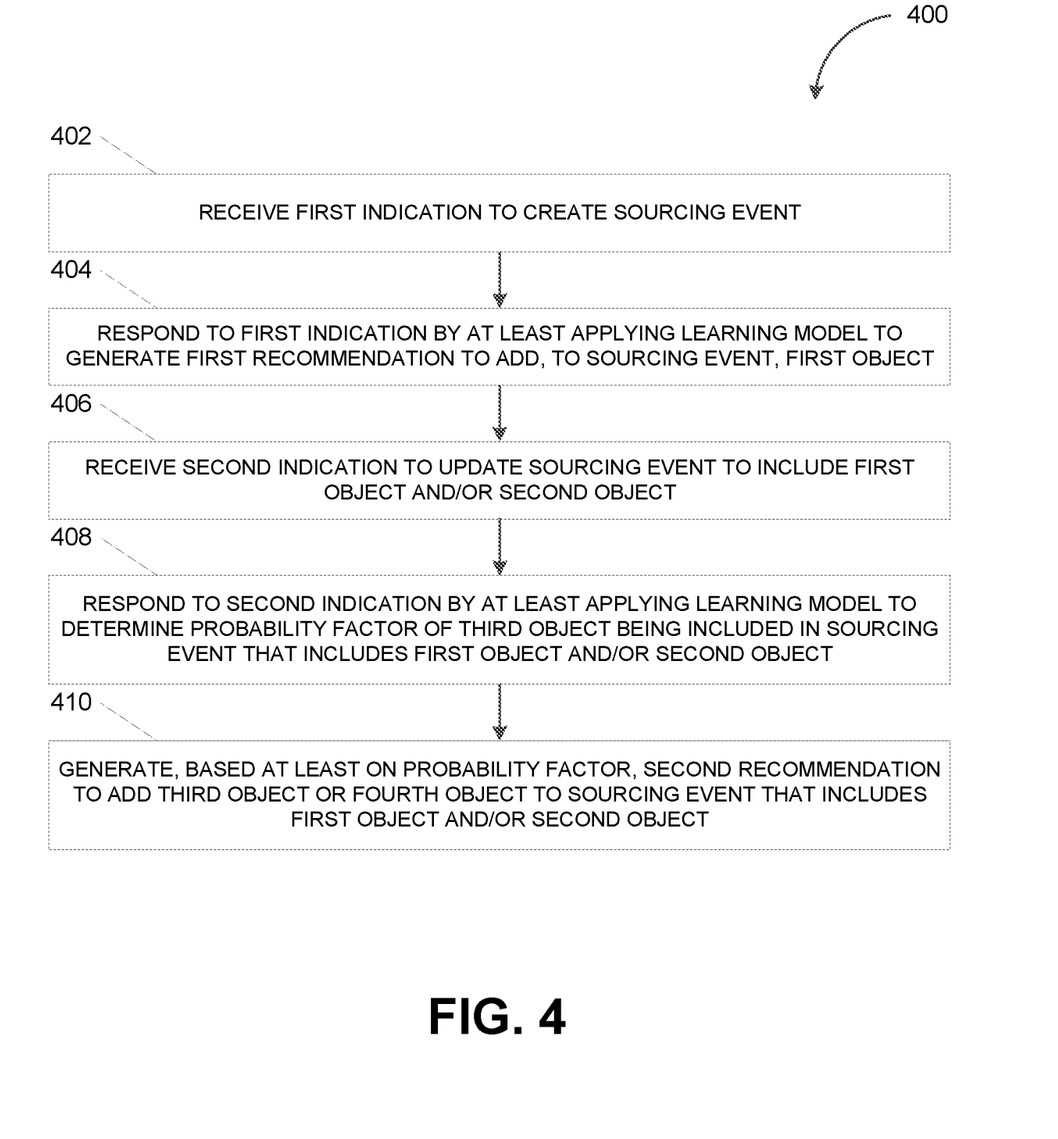
FIG. 4 depicts a flowchart illustrating a process for generating a recommendation, in accordance with some example embodiments.

FIG. 4 depicts a flowchart illustrating a process 400 for generating a recommendation, in accordance with some example embodiments. Referring to FIGS. 1, 2A-C, and 4, the process 400 may be performed by the recommendation engine 110.

At 402, the recommendation engine 110 may receive, from the first client 120A, a first indication to create a sourcing event. For example, the recommendation engine 110 may receive, from the first client 120A, an indication to create a sourcing event that does not initially include any objects.

At 404, the recommendation engine 110 may respond to the first indication by at least applying the learning model 145 to generate a first recommendation to add, to the sourcing event, a first object. For instance, the recommendation engine 110 may identify, based at least on the first table 200 included in the learning model 145, that the frequency of OBJECT A being included in a sourcing event associated with USER 1 at the first client 120A if higher than the frequency of OBJECT B and OBJECT C being included in a sourcing event associated with USER 1. Alternatively and/or additionally, the recommendation engine 110 may determine, based at least on the first table 200, that the frequency of OBJECT A being included in a sourcing event associated with USER 1 exceeds a threshold value while the respective frequencies of OBJECT B and OBJECT C being included in a sourcing event associated with USER 1 does not exceed the threshold value. Accordingly, the recommendation engine 110 may generate a recommendation for USER 1 at the first client 120A to add OBJECT A to the sourcing event.

At 406, the recommendation engine 110 may receive, from the first client 120A, a second indication to update the sourcing event to include the first object and/or a second object. For example, the recommendation engine 110 may receive, from the first client 120A, an indication to update a sourcing event to include OBJECT A and/or OBJECT B.

At 408, the recommendation engine 110 may respond to the second indication by at least applying the learning model to determine a probability factor of a third object being included in a sourcing event that includes the first object and/or the second object. In some example embodiments, the recommendation engine 110 may respond to the indication to update a sourcing event to include OBJECT A and/or OBJECT B by at least determining a probability factor of OBJECT C being included in a sourcing event that includes OBJECT A and/or OBJECT B.

For example, in response to USER 1 at the first client 120A creating a sourcing event that includes OBJECT A, the recommendation engine 110 may determine, based at least on the first table 200 and/or the second table 250 included in the learning model 145, a probability factor of OBJECT C being included in the sourcing event along with OBJECT A. As Equation (1) indicates, the recommendation engine 110 may determine this probability based at least on a frequency of OBJECT A and OBJECT C being included in a sourcing event and a frequency of OBJECT A being included in a sourcing event. Alternatively and/or additionally, in response to USER 1 at the first client 120A creating a sourcing event that includes OBJECT A and OBJECT B, the recommendation engine 110 may determine the probability factor of based at least on the first table 200 and/or the second table 250 included in the learning model 145, a probability factor of OBJECT C being included in the sourcing event along with OBJECT A and OBJECT B. In accordance with Equation (2), the recommendation engine 110 may determine this probability factor based at least on a frequency of OBJECT A and OBJECT C being included in a sourcing event, a frequency of OBJECT A being included in a sourcing event, a frequency of OBJECT B and OBJECT C being included in a sourcing event, and a frequency of OBJECT B being included in a sourcing event.

At 410, the recommendation engine 110 may generate, based at least on the probability factor, a second recommendation to add, to the sourcing event that includes the first object and/or the second object, the third object. For example, the recommendation engine 110 may generate a recommendation to add OBJECT C to the sourcing event that includes OBJECT A and/or OBJECT B based at least on the probability factor of OBJECT C being included in a sourcing event that includes OBJECT A and/or OBJECT B being greater than that of OBJECT D. Alternatively and/or additionally, the recommendation engine 110 may generate a recommendation to add OBJECT C to the sourcing event that includes OBJECT A and/or OBJECT B based at least on the probability factor of OBJECT C being included in a sourcing event that includes OBJECT A and/or OBJECT B exceeding a threshold value.

Figure 5:
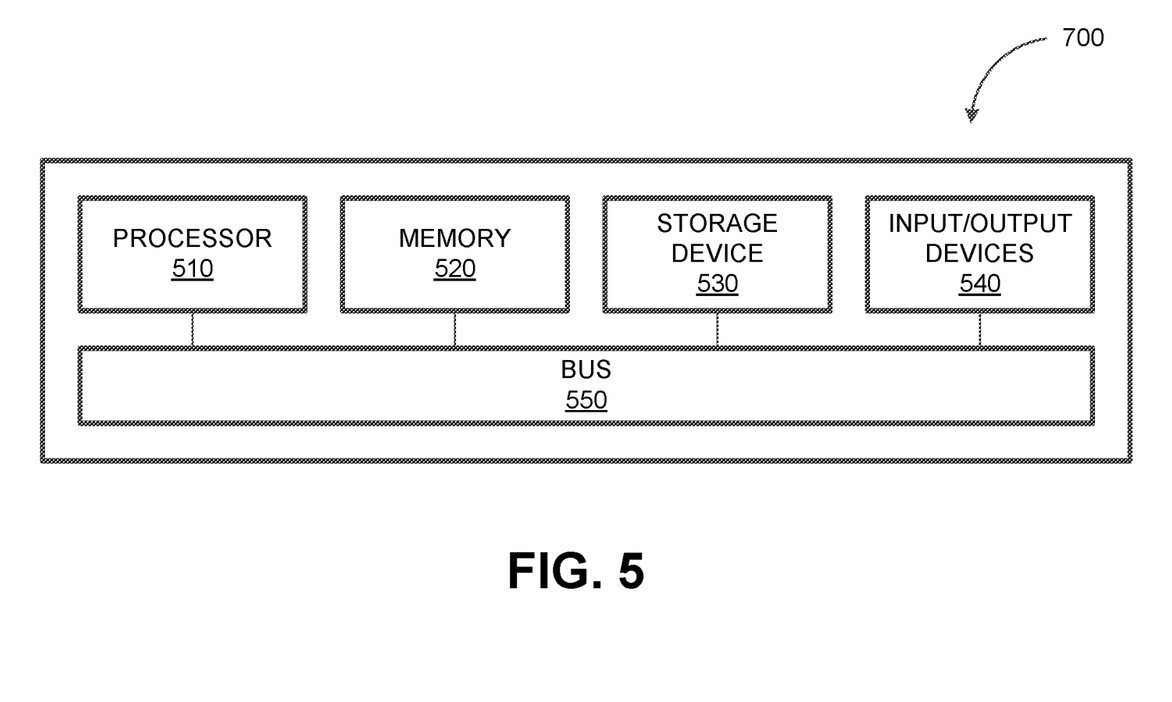
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the recommendation engine 110 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the recommendation engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state drive, and/or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing objects and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program object, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more objects. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
    at least one data processor; and
    at least one memory storing instructions which, when executed by the at least one data processor, results in operations comprising:
        receiving, at a recommendation engine, a first indication to create a first sourcing event for a first user of a group of users having at least one attribute in common, the first sourcing event comprising a first object and a second object;
        responding to the first indication by at least updating a learning model, the learning model being updated by at least incrementing a first frequency of the first object being included in a sourcing event corresponding to the first user, a second frequency of the second object being included in the sourcing event corresponding to the first user, and/or a third frequency of the first object and the second object being included simultaneously in the sourcing event corresponding to the first user;
        receiving, at the recommendation engine, a second indication to create a second sourcing event for the first user, the second sourcing event comprising the first object;
    determining, by the learning model, a first probability associated with the second sourcing event comprising the second object in addition to the first object, the first probability corresponding to a ratio of the third frequency that the first object and the second object being included simultaneously in the sourcing event corresponding to the first user and the first frequency of the first object being included in the sourcing event corresponding to the first user;
    generating, based at least on the first probability satisfying a condition, a first recommendation to add the second object to the second sourcing event for the first user;
    in response to a third indication to create the second sourcing event without the second object, updating the learning model by at least incrementing the first frequency of the first object being included in the sourcing event;
    generating, at a database, a database object corresponding to the second sourcing event corresponding to the first user, the database object comprising a size adjustable table; and
    updating, at the database, the database object based on sourcing events corresponding to the first user of the group of users by dynamically expanding the size adjustable table storing the first object and the second object, the size adjustable table being used by the learning model to track object occurrence in sourcing events across the group of users.

2. The system of claim 1, wherein the condition comprises that the first probability exceeds a second probability of the second sourcing event including a third object in addition to the first object.

3. The system of claim 1, wherein the condition comprises that the first probability exceeds a threshold value.

4. The system of claim 1, wherein the operations further comprise:
receiving, at the recommendation engine, a fourth indication to create the second sourcing event to add the second object to the second sourcing event;
responding to the fourth indication by at least applying the learning model to determine a second probability of a third object being included in the sourcing event that includes the first object and the second object, the second probability being determined based at least on the first frequency of the first object being included in the sourcing event, the second frequency of the second object being included in the sourcing event, a fourth frequency of the first object and the third object being simultaneously included in the sourcing event, and a fifth frequency of the second object and the third object being simultaneously included in the sourcing event; and
in response to the second probability satisfying the condition, generating a second recommendation to add, to the second sourcing event, the third object.

5. The system of claim 1, wherein the learning model comprises a first table configured to store the first frequency and the second frequency, and wherein the learning model further comprises a second table configured to store the third frequency.

6. The system of claim 5, wherein the operations further comprise:
in response to a determination that the learning model does not include the first object and/or the second object, expanding the first table and/or the second table to include the first object and/or the second object.

7. The system of claim 5, wherein the first table and/or the second table are stored in the database, and wherein the recommendation engine queries the database in order to update and/or apply the learning model.

8. The system of claim 1, wherein the first recommendation is generated using the first frequency, the second frequency, and/or the third frequency based at least on the second indication to create the second sourcing event being received from the first user.

9. The system of claim 1, wherein at least one attribute comprises an entity associated with each user of the group of users.

10. A computer-implemented method comprising:
receiving, at a recommendation engine, a first indication to create a first sourcing event for a first user of a group of users having at least one attribute in common, the first sourcing event comprising a first object and a second object;
responding to the first indication by at least updating a learning model, the learning model being updated by at least incrementing a first frequency of the first object being included in a sourcing event corresponding to the first user, a second frequency of the second object being included in the sourcing event corresponding to the first user, and/or a third frequency of the first object and the second object being included simultaneously in the sourcing event corresponding to the first user;
receiving, at the recommendation engine, a second indication to create a second sourcing event for the first user, the second sourcing event comprising the first object;
determining, by at least applying the learning model, a first probability associated with the second sourcing event comprising the second object in addition to the first object, the first probability corresponding to a ratio of the third frequency that the first object and the second object being included simultaneously in the sourcing event corresponding to the first user and the first frequency of the first object being included in the sourcing event corresponding to the first user;
generating, based at least on the first probability satisfying a condition, a first recommendation to add the second object to the second sourcing event for the first user;
in response to a third indication to create the second sourcing event without the second object, updating the learning model by at least incrementing the first frequency of the first object being included in the sourcing event;
generating, at a database, a database object corresponding to the second sourcing event corresponding to the first user, the database object comprising a size adjustable table; and
updating, at the database, the database object based on sourcing events corresponding to the first user of the group of users by dynamically expanding the size adjustable table storing the first object and the second object, the size adjustable table being used by the learning model to track object occurrence in sourcing events across the group of users.

11. The computer-implemented method of claim 10, wherein the condition comprises that the first probability exceeds a second probability of the second sourcing event including a third object in addition to the first object.

12. The computer-implemented method of claim 10, wherein the condition comprises that the first probability exceeds a threshold value.

13. The computer-implemented method of claim 10, further comprising:
receiving, at the recommendation engine, a fourth indication to create the second sourcing event to add the second object to the second sourcing event;
responding to the fourth indication by at least applying the learning model to determine a second probability of a third object being included in the sourcing event that includes the first object and the second object, the second probability being determined based at least on the first frequency of the first object being included in the sourcing event, the second frequency of the second object being included in a sourcing event, a fourth frequency of the first object and the third object being simultaneously included in the sourcing event, and a fifth frequency of the second object and the third object being simultaneously included in the sourcing event; and
in response to the second probability satisfying the condition, generating a second recommendation to add, to the second sourcing event, the third object.

14. The computer-implemented method of claim 10, wherein the learning model comprises a first table configured to store the first frequency and the second frequency, and wherein the learning model further comprises a second table configured to store the third frequency.

15. The computer-implemented method of claim 14, further comprising:
in response to a determination that the learning model does not include the first object and/or the second object, expanding the first table and/or the second table to include the first object and/or the second object.

16. The computer-implemented method of claim 14, wherein the first table and/or the second table are stored in the database, and wherein the recommendation engine queries the database in order to update and/or apply the learning model.

17. The computer-implemented method of claim 10, wherein the first frequency, the second frequency, and the third frequency are associated with a group of users having at least one attribute in common, and wherein the first recommendation is generated using the first frequency, the second frequency, and/or the third frequency based at least on the second indication to create the second sourcing event being received from a user associated with the group of users.

18. A non-transitory computer-readable medium storing instructions, which when executed by at least one data processor, results in operations comprising:

receiving, at a recommendation engine, a first indication to create a first sourcing event for a first user of a group of users having at least one attribute in common, the first sourcing event comprising a first object and a second object;

responding to the first indication by at least updating a learning model, the learning model being updated by at least incrementing a first frequency of the first object being included in a sourcing event corresponding to the first user, a second frequency of the second object being included in the sourcing event corresponding to the first user, and/or a third frequency of the first object and the second object being included simultaneously in the sourcing event corresponding to the first user;

receiving, at the recommendation engine, a second indication to create a second sourcing event for the first user, the second sourcing event comprising the first object;

determining, by the learning model, a first probability associated with the second sourcing event comprising the second object in addition to the first object, the first probability corresponding to a ratio of the third frequency that the first object and the second object being included simultaneously in the sourcing event corresponding to the first user and the first frequency of the first object being included in the sourcing event corresponding to the first user;

generating, based at least on the first probability satisfying a condition, a first recommendation to add the second object to the second sourcing event for the first user;

in response to a third indication to create the second sourcing event without the second object, updating the learning model by at least incrementing the first frequency of the first object being included in the sourcing event;

generating, at a database, a database object corresponding to the second sourcing event corresponding to the first user, the database object comprising a size adjustable table; and updating, at the database, the database object based on sourcing events corresponding to the first user of the group of users by dynamically expanding the size adjustable table storing the first object and the second object, the size adjustable table being used by the learning model to track object occurrence in sourcing events across the group of users.

* * * * *